United States Patent [19]

Adang

[11] Patent Number: 4,579,352
[45] Date of Patent: Apr. 1, 1986

[54] SEAL

[75] Inventor: François M. Adang, Boxtel, Netherlands

[73] Assignee: Single Buoy Moorings Inc., Marly, Switzerland

[21] Appl. No.: 693,962

[22] Filed: Jan. 23, 1985

[30] Foreign Application Priority Data

Jan. 23, 1984 [NL] Netherlands ............ 8400209

[51] Int. Cl.$^4$ .............................. F16J 15/32
[52] U.S. Cl. .................... 277/205; 277/227
[58] Field of Search ............. 277/152, 153, 205, 227

[56] References Cited

U.S. PATENT DOCUMENTS

| 3,400,411 | 9/1968 | Harvey | 277/227 |
| 4,263,243 | 4/1981 | Wilson | 277/227 |
| 4,345,771 | 8/1982 | Hasegawa et al. | 277/205 |
| 4,519,616 | 5/1985 | Johnston | 277/205 |

FOREIGN PATENT DOCUMENTS

| 158861 | 7/1921 | United Kingdom . |
| 906958 | 9/1962 | United Kingdom . |

Primary Examiner—Robert I. Smith
Attorney, Agent, or Firm—Young & Thompson

[57] ABSTRACT

The invention is a seal for the gap between two parts which may or may not rotate with respect to each other which seal comprises a body of flexible material placed in a groove of one part and having a lip pressed against the surface of the other part, said lip having a reinforcement of a more rigid material which towards the surface engaged by the lip has ridges of a smaller surface area than the areas turned away from said surface, said reinforcement eventually extending through some or all other parts of the seal to prevent extrusion into the gap.

12 Claims, 7 Drawing Figures

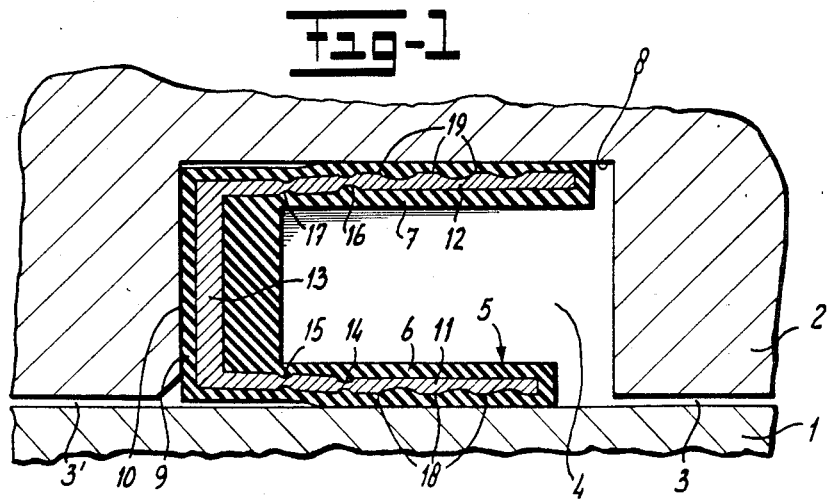
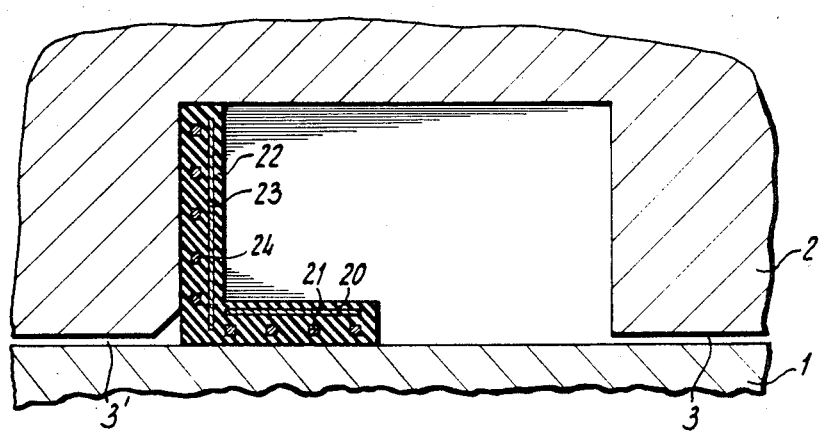
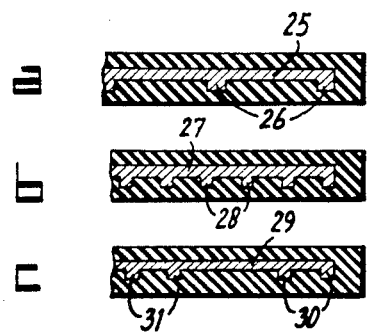

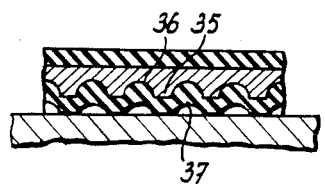
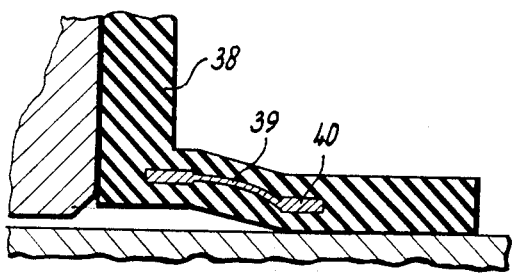
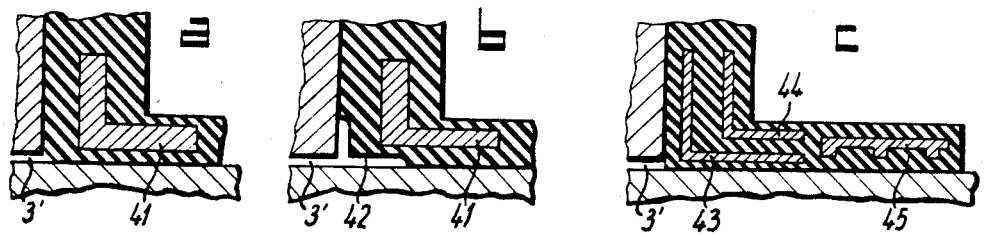

SEAL

The invention relates to a seal between two surfaces between which a gap exists, where on one side of the gap a higher medium pressure may prevail than on the side of the gap beyond the seal, the latter consisting of a body of flexible material disposed in a groove in at least one of the surfaces and which by means of a lip bears against the other surface, this lip being directed towards the side on which the pressure is higher.

Many types of seals of this kind are known, both for parts which do not move relative to one another and between which a gap requiring sealing exists, and for parts undergoing a rotational and/or translatory movement relative to one another. This known seal consists of a flexible and usually elastic material, while the pressure acting on the interior side of the lip cooperates in pressing the lip sealingly against the surface which is to be sealed. This pressure can and usually is derived from the pressure of the medium in relation to which the seal is to be provided, but may also arise from the dimensions and shape of the seal inside the space formed by the groove, in such a manner that the seal is under pressure.

This known seal has a number of shortcomings. In the case of parts moving relative to one another the seal will be subject to wear because the sealing lip, although pressed into contact with relatively low specific pressure, always requires for effective sealing an area where the specific pressure is high. Wear may result in leakage.

In addition, wear may sooner or later occur as the result of manufacturing inaccuracy or tolerances. Another shortcoming, which may occur principally in the case of seals acting against high pressures, consists in that the material of the seal is so-to-speak extruded into the gap requiring to be sealed, which, particularly in the case of parts moving relative to one another, leads to damaged seals and thus once again to leakage.

In addition, in the case of sealing against high liquid or gas pressures the difficulty may arise that the sealing material itself is insufficiently gastight, that is to say in a certain sense is permeable, so that here again leakage occurs, even if only to a moderate extent.

The invention seeks to provide a seal exempt from the abovementioned disadvantages and with which these disadvantages can be overcome in a simple manner.

According to the invention this aim is primarily achieved in that the lip of the seal, lying against the surface which is to be sealed, is provided with stifening means or reinforcement, whereby the pressure acting on the inner side of the lip is distributed over one or more zones which are stiffened by the reinforcement and which on the side where the surface to be sealed is situated have a smaller surface than the surface of the stiffening means or reinforcement remote therefrom. The stiffening means or reinforcement ensures pressure distribution whereby the pressure applied by the lip is concentrated in one or more zones of smaller area, so that the specific pressure applied via the sealing material to the area to be sealed is higher. At the same time the stiffening means or reinforcement may also be prestressed, but it is also possible only to make use of the higher pressure, on the inner side of the sealing lip, of the medium against which sealing is required.

If wear now occurs in the case of seals between parts moving relative to one another, the seal will nevertheless have a longer life because the sealing pressure is concentrated in one or more zones, while the problems which could arise as the result of tolerances are likewise avoided.

The improvement according to the invention prevents deterioration of the seal through creep. Wear is mainly avoided because the specific pressure now need not be made higher than is necessary.

This principle of pressure distribution with a higher specific pressure against the surface to be sealed can also be applied according to the invention when the seal also comprises, in addition to a lip, a part integral with the lip and extending in the groove in a plane lying transversely to the surface to be sealed, this part lying against a side wall of the groove, and also in the case of a seal which has a second lip integral with the first lip and lying against that surface of the groove which lies opposite the surface which is to be sealed. In the first case the seal will have a substantially L-shaped section, and in the second case the seal can be V-shaped or U-shaped.

In all these cases the reinforcement may consist of a single piece which extends through all the different parts of the section of the seal and towards the inside has a larger area than the zones situated towards the outside.

The reinforcement or stiffening can consist of any suitable material capable of pressure distribution. Thus, it is conceivable for a sealing material consisting of plastics material or rubber to be provided with reinforcing layers consisting of textile or glass fibres, either in the form of strings or of fabrics which, when they are not incorporated in the material of the seal, have great flexibility and scarcely any stiffness in flexure, but which, as soon as they are incorporated in the material, impart to the material of the seal, which in itself is flexible, great stiffness due to the phenomenon, known per se, whereby the material of the seal completely encapsulates or is penetrated by the stiffening material or reinforcement.

However, according to the invention preference is given to a reinforcement whose modulus of elasticity is higher than that of the material of the seal. In this case the reinforcement or stiffening may consist of a part of plastics material or metal of the required profile.

Stiffening or reinforcement which extends to the corner portion of the seal, that is to say to the corner portion between the sealing lip and the portion lying against the side wall of the groove, will reduce substantially, if not completely eliminate, the danger of extrusion, and can also reduce or eliminate permeability.

According to the invention, it is however also possible for one or more L-shaped reinforcements or stiffenings to be disposed in the aforesaid corner of the seal. These make extrusion impossible and they may, if desired, also be in the form of a spring for effecting the previously mentioned prestressing.

Any form of stiffening or reinforcement may be gastight, and this is preferably definitely the case at the previously mentioned corner. The stiffening or reinforcement in the seal according to the invention preferably has ridges or ribs which face the surface or surfaces to be sealed and which are held away from said surfaces by the material of the seal, while between them the reinforcement is at a greater distance from the surface or surfaces which are to be sealed than at the sites of the ridges or ribs.

Since the seal now acts on the surface or surfaces which are to be sealed by means of zones of different specific pressures, it is desirable for the sealing surfaces, of the seal, particularly the surface of the lip which lies against the surface which is to be sealed, to be provided with grooves in the zones between the ridges or ribs of the reinforcement, that is to say between the areas where the specific pressure is higher. This ensures not only that the seal acts on the surfaces which are to be sealed solely through the zones of higher specific pressure, but also that any particles becoming free through wear can escape into the grooves, where they can retained and be unable to cause leakage by pressing the sealing lip away from the surface being sealed or by enlarging the zone where contact pressure is high, thus lowering the value of the local contact pressure.

The stiffening or reinforcement need not necessarily be in one piece, but may also consist of a pressure distributing layer and of ridges or ribs enclosed in the material of the seal independently of that layer.

The profile of the ridges or ribs may be rectangular in section, but may also have any other desired shape, such as a tapering trapezium shape.

The invention will now be explained in greater detail with the aid of the drawings.

FIG. 1 shows diagrammatically in section a preferred form of construction of the seal according to the invention.

FIG. 2 shows a variant in the same manner as FIG. 1.

FIG. 3 shows in FIGS. 3a, b and c a number of variants for the arrangement of the ridges or ribs in the sealing lip.

FIG. 4 shows in FIGS. 4a to d a number of variants for the profiling of the ridges or ribs.

FIG. 5 shows diagrammatically a variant in which grooves are provided in the material of the seal itself.

FIG. 6 shows diagrammatically in section an embodiment in which the reinforcement consists of a spring.

FIG. 7 shows in FIGS. 7a, b and c a number of variants with a corner reinforcement counteracting extrusion.

FIG. 1 shows a seal between two parts 1 and 2 which are movable relative to one another and between which a gap 3 exists. In the part 2 a groove 4 is formed, in which a seal 5 is disposed. This seal lies by means of a lip 6 against the surface of the part 1, and by means of a second lip 7 against the opposite inner surface 8 of the groove 4. The two lips 6 and 7 are joined together in the shape of a U by means of a base 9, which lies against the side surface 10 of the groove 4.

The sealing material of the lips 6 and 7 and the base 9, which form an integral whole, may or may not be elastically flexible material, such as rubber or plastics material.

This seal contains a stiffening or reinforcement which, just like the seal, has a U-shaped section and consists of two horizontal legs 11 and 12 respectively and a connecting leg 13.

This stiffening or reinforcement may consist of metal or plastics material or else of layers of fabric integrally moulded or incorporated by vulcanisation.

The seal shown must seal against a higher pressure entering via the gap 3 on the right of the groove 4 and against the gap 3' on the left of the groove 4.

The stiffening or reinforcement has hinge points at 14 and 15 in the leg 11. The same applies to the leg 12 at the constrictions 16 and 17. The surface of the leg 11 facing away from the part 1 is larger than the surface of the ridges 18 facing the part 1. The same is true of the leg 12, which is provided with ridges 19.

The pressure applied by the leg 6 of the seal to the surface of the part 1 will now be distributed over the zones of the sealing material which lie directly under the ridges 18, so that a concentration of contact pressure and consequently increased specific pressure occur there. The same obviously occurs in the case of the leg 7. The stiffening or reinforcement is in the form of a single piece, so that it will already prevent the material of the seal from being extruded into the gap 3' and, when it is made of gastight material, such as plastics material or metal, will reduce permeability to practically zero.

In the embodiment shown in FIG. 2, the groove 4 in the part 2 contains a substantially L-shaped seal of flexible material, in which stiffening is disposed in the form of a layer 20 and, detached therefrom, a number of rods 21. In the case of an annular seal the layer is then obviously a cylindrical plate and the rods 21 are rings. Here also the pressure prevailing in the groove 4 will be applied via the plate 20 to the rods or rings 21, and thus zones of increased specific pressure will be created on the surface of the part 1.

The vertical leg 22 of this seal also contains a plate or disc 23, together with rods or rings 24.

In the case of an annular seal, such as is customary for parts rotatable relative to one another, the stiffening or reinforcement may be so constructed as to permit a reduction of diameter to a very limited extent, for example by not constructing the stiffening or reinforcement, such as the plate 20 and rings 21, in the form of a closed ring but constructing it of segments with very small clearances between their ends. These small clearances do not affect the distribution of pressure, but do permit the contraction of the stiffening or reinforcement, so that the latter can better adapt to possible wear and tolerances. In the case of a permeable plastics material this arrangement is not entirely leakproof.

FIG. 3a shows that the stiffening or reinforcement 25 may have a small number of ridges 26 spaced relatively wide apart.

FIG. 3b shows a stiffening or reinforcement 27 provided with a large number of ridges 28 with closer spacing.

FIG. 3c shows a stiffening or reinforcement 29 provided with groups of ridges 30 and 31 respectively.

FIG. 4a shows that the ridges or ribs 32 may have a V-shaped profile. FIG. 4b shows ribs 33 having a trapezium-shaped profile. FIG. 4c shows ribs 34 having a profile which tapers to a point and which on the inside is rounded, and FIG. 4 shows ridges 35 which merge into one another via a rounded portion 36.

In all these embodiments shown in the Figures described above the surface of the respective lip making contact with the surface against which it must provide a seal is shown as a closed surface.

As a variant to the embodiment shown in FIG. 4d, FIG. 5 now shows that the sealing material may be provided, between the ridges 35 and under the curved connecting part 36 of the reinforcement, with grooves 37 in which particles worn off can be collected. Such grooves are of course conceivable in any embodiment illustrated in the previous Figures.

FIG. 6 shows diagrammatically a seal which may be L-shaped or U-shaped and which is designated 38, this seal beng provided with a prestressed spring 39 which at 40 forms a single zone increasing the specific pressure.

FIG. 7a shows an L-shaped reinforcement 41 at the corner of an L-shaped or U-shaped seal, this reinforcement serving to reduce permeability and above all to prevent extrusion of the sealing material into the gap 3'.

FIG. 7b shows a similar seal 41 which now makes it possible for the seal to be given at the corner a profile 42 which brings the corner part further away from the gap 3'.

In the embodiment shown in FIG. 7c two L-shaped reinforcements or stiffenings 43 and 44 are provided, and the pressure distributing reinforcement is indicated at 45.

The seal according to the invention is preferably used for parts making a rotary or translatory movement relative to one another, and is usually in the form of a ring. The seal can however also be used in cases where it can consist of rectilinear strips or for a polygonal profile requiring sealing, and also where the parts which are to be sealed relative to one another are not movable relative to one another although a gap must exist, for example because of thermal stresses.

I claim:

1. Seal between two surfaces between which a gap exists and where on one side of the gap a higher medium pressure may prevail than on the side of the gap beyond the seal, the latter consisting of a body of flexible material disposed in a groove in at least one of the surfaces and which by means of a lip bears against the other surface, this lip being directed towards the side on which the pressure is higher, characterised in that the lip of the seal, lying against the surface which is to be sealed, is provided with stiffening means or reinforcement, whereby the pressure acting on the inner side of the lip is distributed over one or more zones which are stiffened by the reinforcement and which on the side where the surface to be sealed is situated have a smaller surface than the surface of the stiffening means or reinforcement remote therefrom.

2. Seal according to claim 1, characterised in that the stiffening or reinforcement acts with prestressing in the direction of the surface which is to be sealed.

3. Seal according to claim 1, wherein the seal also consists, in addition to the lip, of a part integral with the lip and extending in the groove in a plane lying transversely to the surface to be sealed, this part lying against a wall of the groove, characterised in that this part is likewise provided with stiffening or reinforcement which forms divided zones facing the surface of the side wall and having a smaller surface than the surface of the side of the stiffening or reinforcement facing the interior of the groove.

4. Seal according to claim 1, which has a second lip integral with the first lip and lying against that surface of the groove which lies opposite the surface which is to be sealed, characterised in that this second lip is likewise provided with a stiffening or reinforcement of which the portion facing the surface of the groove forms one or more zones having a smaller surface than the inwardly facing surface of the stiffening or reinforcement.

5. Seal according to claim 4, characterised in that the seal is U-shaped in section.

6. Seal according to claim 4, characterised in that the stiffening or reinforcement is in one piece which extends through the leg or legs of the seal and through that portion of the seal which lies against the side wall of the groove.

7. Seal according to claim 1, characterised in that one or more L-shaped reinforcements is or are disposed in the corner of the seal, lying between the lip lying against the surface which is to be sealed and the portion lying against the side wall of the groove.

8. Seal according to claim 1, characterised in that the stiffening or reinforcement is gastight or oiltight.

9. Seal according to claim 1, characterised in that the stiffening or reinforcement has a higher modulus of elasticity than the material of the seal.

10. Seal according to claim 1, characterised in that the reinforcement or stiffening has ridges which are directed towards the surface or surfaces to be sealed, and which are held away from the surfaces to be sealed by the material of the seal, while between them the stiffening or reinforcement is at a greater distance from the surface or surfaces to be sealed than at the positions of the ridges.

11. Seal according to claim 10, characterised in that the sealing surface or surfaces is or are provided with grooves between the zones in which the ridges of the stiffening or reinforcement are situated.

12. Seal according to claim 1, characterised in that the stiffening or reinforcement consists of a pressure distributing layer and of ridges or ribs enclosed independently thereof in the material of the seal.

* * * * *